(12) United States Patent
Tabata

(10) Patent No.: US 8,545,957 B2
(45) Date of Patent: Oct. 1, 2013

(54) OPTICAL INFORMATION RECORDING MEDIUM AND MANUFACTURING METHOD THEREOF AND OPTICAL INFORMATION RECORDING MEDIUM RECORDING LAYER

(75) Inventor: Hiroshi Tabata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/354,835

(22) Filed: Jan. 20, 2012

(65) Prior Publication Data

US 2012/0201991 A1    Aug. 9, 2012

(30) Foreign Application Priority Data

Feb. 3, 2011 (JP) .................................. 2011-022181

(51) Int. Cl.
*G11B 7/24* (2013.01)
(52) U.S. Cl.
USPC ..................... 428/64.1; 428/64.4; 430/270.12
(58) Field of Classification Search
USPC .................................... 428/64.4; 430/270.12
See application file for complete search history.

(56) References Cited

U.S. PATENT DOCUMENTS

2012/0176883 A1*  7/2012  Tauchi et al. .................. 369/283
2012/0177863 A1*  7/2012  Tauchi et al. ................. 428/64.4

FOREIGN PATENT DOCUMENTS

| JP | 2010137545 | 6/2010 |
| JP | 2010218636 | 9/2010 |

* cited by examiner

*Primary Examiner* — Elizabeth Mulvaney
(74) *Attorney, Agent, or Firm* — K&L Gates LLP

(57) ABSTRACT

An optical information recording medium including a substrate; two or more recording layers provided on the substrate; and a protective layer provided on the recording layers, wherein the surface of one of the side of the substrate and the protective layer is a light irradiation plane, at least one of the recording layers other than the recording layer at the deepest position from the light irradiation plane includes W, Pd, and Cu oxides as the principal components, and the ratio of W, Pd, and Cu that are respectively included in the W, Pd, and Cu oxides satisfies the relationship $0.17 \leq x_1$ (where $x_1 = a/(b+0.8c)$, where a: atomic ratio of W with respect to the total of W, Pd, and Cu, b: atomic ratio of Pd with respect to the total of W, Pd, and Cu, and c: atomic ratio of Cu with respect to the total of W, Pd, and Cu).

17 Claims, 4 Drawing Sheets

OPTICAL INFORMATION RECORDING MEDIUM AND MANUFACTURING METHOD THEREOF AND OPTICAL INFORMATION RECORDING MEDIUM RECORDING LAYER

CROSS REFERENCES TO RELATED APPLICATIONS

The present application claims priority to Japanese Priority Patent Application JP 2011-022181 filed in the Japan Patent Office on Feb. 3, 2011, the entire content of which is hereby incorporated by reference.

BACKGROUND

The present disclosure relates to an optical information recording medium and a manufacturing method thereof and an optical information recording medium recording layer. In detail, the present disclosure relates to an optical information recording medium with two or more recording layers.

The market for optical information recording media has hitherto been led by CDs (Compact Discs), DVDs (Digital Versatile Discs), and the like. However, in recent years, along with the proliferation of high definition television and a dramatic increase in data handled by PCs (Personal Computers), there is a demand for further increases in the capacities of optical information recording media. To meet such demand, mass storage optical information recording media that are compatible with blue lasers such as BDs (Blu-ray Discs (registered trademark)) have appeared, and markets for new mass storage information recording media are being established.

Although there are rewritable optical information recording media typified by the CD-RW (Compact Disc-ReWritable) and the DVD±RW (Digital Versatile Disc±ReWritable) and write-once type optical information recording media typified by the CD-R (Compact Disc-Recordable) and the DVD-R (Digital Versatile Disc-Recordable) as recordable optical information recording media, the latter in particular have contributed greatly to the expansion of the market as low cost media. Accordingly, with mass storage optical information recording media that are compatible with blue lasers, lowering the cost of write-once type optical information recording media is likewise considered important in order to expand the market. Furthermore, it is generally said that compared to hard disk drives (HDD) or flash memories, optical information recording media have high storage reliability due to the recording and reproduction principle thereof, and are in demand for use as archival media, starting to be used for the storage of critical information.

As the recording material that is used in a write-once type optical information recording medium, there are inorganic materials and organic pigment materials. Although organic pigment materials have mainly been considered for the recording material of a write-once type optical information recording media of the related art, with the mass-storage optical information recording media of recent years, inorganic materials are also being widely considered for the recording material.

For example, an inorganic recording layer that includes In oxide and Pd oxide where the Pd oxide includes Pd monoxide and Pd dioxide and the ratio of Pd atoms with respect to the total of In atoms and Pd atoms is 6 atomic % to 60 atomic % is proposed in Japanese Unexamined Patent Application Publication No. 2010-137545. Further, an inorganic recording layer that includes one or both of In and Sn, Pd, and O is proposed in Japanese Unexamined Patent Application Publication No. 2010-218636.

Incidentally, in recent years, in order to further increase the recording capacity in recordable high-density optical information recording media such as DVDs and BDs, techniques for increasing the number of recording layers have been widely adopted. With a multi-layer optical information recording medium, recording and reproduction of information signals with respect to the recording layer positioned at the deepest position from the information reading face side is performed using laser light that has transmitted through the recording layer to the front side of the recording layer positioned at the deepest position. Therefore, the more recording layers there are, the more recording layers there are through which the laser light transmits before reaching the recording layer positioned at the deepest position, and it is desirable for recording layers other than the recording layer positioned at the deepest position from the information reading face side to have high transmittance.

Demand for further increasing the recording capacity by increasing the number of recording layers is also growing for write-once type optical information recording media, and the improvement of transmittance of inorganic recording layers is an important technique in meeting such a demand.

SUMMARY

It is desirable to provide an optical information recording medium with excellent transmittance properties and a manufacturing method thereof and an optical information recording medium recording layer.

According to a first embodiment of the present disclosure, there is provided an optical information recording medium including: a substrate; two or more recording layers provided on the substrate; and a protective layer provided on the recording layers, wherein the surface of one of the side of the substrate and the protective layer is a light irradiation plane on which light for recording information signals on the two or more recording layers is irradiated, at least one of the recording layers other than the recording layer at the deepest position from the light irradiation plane includes W oxide, Pd oxide, and Cu oxide as the principal components, and the ratio of W, Pd, and Cu that are respectively included in the W oxide, the Pd oxide, and the Cu oxide satisfies the relationship $0.17 \leq x_1$ (where $x_1 = a/(b+0.8c)$, where a: atomic ratio (atomic %) of W with respect to the total of W, Pd, and Cu, b: atomic ratio (atomic %) of Pd with respect to the total of W, Pd, and Cu, and c: atomic ratio (atomic %) of Cu with respect to the total of W, Pd, and Cu).

According to a second embodiment of the present disclosure, there is provided an optical information recording medium recording layer including: W oxide, Pd oxide, and Cu oxide as the principal components, wherein the ratio of W, Pd, and Cu that are respectively included in the W oxide, the Pd oxide, and the Cu oxide satisfies the relationship $0.17 \leq x_1$ (where $x_1 = a/(b+0.8c)$, where a: atomic ratio (atomic %) of W with respect to the total of W, Pd, and Cu, b: atomic ratio (atomic %) of Pd with respect to the total of W, Pd, and Cu, and c: atomic ratio (atomic %) of Cu with respect to the total of W, Pd, and Cu).

According to a third embodiment of the present disclosure, there is provided a manufacturing method of an optical information recording medium including: forming a metal oxide recording layer by reactive sputtering with at least oxygen using an optical information recording medium target, wherein the optical information recording medium target includes W, Pd, and Cu as the principal components, and the ratio of W, Pd, and Cu satisfies the relationship $0.17-x_1$ (where $x_1 = a/(b+0.8c)$, where a: atomic ratio (atomic %) of W with respect to the total of W, Pd, and Cu, b: atomic ratio (atomic %) of Pd with respect to the total of W, Pd, and Cu, and c: atomic ratio (atomic %) of Cu with respect to the total of W, Pd, and Cu).

According to the first embodiment of the present disclosure, the thickness of the protective layer is not particularly limited, and protective layers include substrates, sheets, and coating layers. As a high-density optical information recording medium, a configuration in which a thin light transmissive layer such as a sheet or a coating layer is adopted as a protective layer and recording and reproduction of information signals are performed by irradiating light from the side of the light transmissive layer is preferable. In such a case, adopting a non-transparent substrate is also possible. The light incidence face for recording or reproducing information signals is set as appropriate to at least one of the surfaces of the protective layer side and the substrate side according to a format of the optical information recording medium.

According to the first and second embodiments of the present disclosure, it is preferable that the ratio of W, Pd, and Cu that are respectively included in the W oxide, the Pd oxide, and the Cu oxide satisfy the relationship $0.37 \leq x_1$.

According to the third embodiment of the present disclosure, it is preferable that the ratio of W, Pd, and Cu satisfy the relationship $0.37 \leq x_1$.

According to the first and second embodiments of the present disclosure, it is preferable that the ratio of W, Pd, and Cu that are respectively included in the W oxide, the Pd oxide, and the Cu oxide satisfy the relationship $0.37 \leq x_1 \leq 1.26$.

According to the third embodiment of the present disclosure, it is preferable that the ratio of W, Pd, and Cu satisfy the relationship $0.37 \leq x_1 \leq 1.26$.

According to the first embodiment of the present disclosure, it is preferable that all recording layers other than the recording layer at the deepest position from the light irradiation plane include W oxide, Pd oxide, and Cu oxide as the principal components, and that the ratio of W, Pd, and Cu that are respectively included in the W oxide, the Pd oxide, and the Cu oxide satisfy the relationship $0.17 \leq x_1$. In such a case, it is preferable that the value of $x_1$ becomes greater for recording layers close to the light irradiation plane.

According to the first embodiment of the present disclosure, it is preferable that a relationship in which the ratio $x_1$ of W, Pd, and Cu that are respectively included in the W oxide, the Pd oxide, and the Cu oxide is greater for recording layers close to the light irradiation plane be satisfied.

According to the first to third embodiments of the present disclosure, it is preferable that the atomic ratio a, the atomic ratio b, and the atomic ratio c respectively satisfy the relationships $10 \leq a \leq 70$, $2 \leq b \leq 50$, and $10 \leq c \leq 70$.

According to the first and second embodiments of the present disclosure, it is preferable that at least one of the recording layers other than the recording layer at the deepest position from the light irradiation plane include W oxide, Pd oxide, Cu oxide, and Zn oxide as the principal components, and that the ratio of W, Pd, Cu, and Zn that are respectively included in the W oxide, the Pd oxide, the Cu oxide, and the Zn oxide satisfy the relationship $0.17 \leq x_2$ (where $x_2=(0.1d+a)/(b+0.8c)$, where a: atomic ratio (atomic %) of W with respect to the total of W, Pd, Cu, and Zn, b: atomic ratio (atomic %) of Pd with respect to the total of W, Pd, Cu, and Zn, c: atomic ratio (atomic %) of Cu with respect to the total of W, Pd, Cu, and Zn, and d: atomic ratio (atomic %) of Zn with respect to the total of W, Pd, Cu, and Zn).

According to the third embodiment of the present disclosure, it is preferable that an optical information recording medium target include W, Pd, Cu, and Zn as the principal components, and that the ratio of W, Pd, Cu, and Zn satisfy the relationship $0.17 \leq x_2$ (where $x_2=(0.1d+a)/(b+0.8c)$, where a: atomic ratio (atomic %) of W with respect to the total of W, Pd, Cu, and Zn, b: atomic ratio (atomic %) of Pd with respect to the total of W, Pd, Cu, and Zn, c: atomic ratio (atomic %) of Cu with respect to the total of W, Pd, Cu, and Zn, and d: atomic ratio (atomic %) of Zn with respect to the total of W, Pd, Cu, and Zn).

According to the first and second embodiments of the present disclosure, in a case when at least one of the recording layers other than the recording layer at the deepest position from the light irradiation plane includes W oxide, Pd oxide, Cu oxide, and Zn oxide as the principal components, it is preferable that the ratio of W, Pd, Cu, and Zn that are respectively included in the W oxide, the Pd oxide, the Cu oxide, and the Zn oxide satisfy the relationship $0.37 \leq x_2$.

According to the third embodiment of the present disclosure, in a case when an optical information recording medium target includes W, Pd, Cu, and Zn as the principal components, it is preferable that the ratio of W, Pd, Cu, and Zn satisfy the relationship $0.37 \leq x_2$.

According to the first and second embodiments of the present disclosure, in a case when at least one of the recording layers other than the recording layer at the deepest position from the light irradiation plane includes W oxide, Pd oxide, Cu oxide, and Zn oxide as the principal components, it is preferable that the ratio of W, Pd, Cu, and Zn that are respectively included in the W oxide, the Pd oxide, the Cu oxide, and the Zn oxide satisfy the relationship $0.37 \leq x_2 \leq 1.26$.

According to the third embodiment of the present disclosure, in a case when an optical information recording medium target includes W, Pd, Cu, and Zn as the principal components, it is preferable that the ratio of W, Pd, Cu, and Zn satisfy the relationship $0.37 \leq x_2 \leq 1.26$.

According to the first embodiment of the present disclosure, in a case when at least one of the recording layers other than the recording layer at the deepest position from the light irradiation plane includes W oxide, Pd oxide, Cu oxide, and Zn oxide as the principal components, it is preferable that all the recording layers other than the recording layer at the deepest position from the light irradiation plane include the W oxide, the Pd oxide, the Cu oxide, and the Zn oxide as the principal components and that the ratio of W, Pd, Cu, and Zn that are respectively included in the W oxide, the Pd oxide, the Cu oxide, and the Zn oxide satisfy the relationship $0.17 \leq x_2$. In such a case, it is preferable that the value of $x_2$ is greater for recording layers that are close to the light irradiation plane.

According to the first embodiment of the present disclosure, in a case when at least one of the recording layers other than the recording layer at the deepest position from the light irradiation plane includes W oxide, Pd oxide, Cu oxide, and Zn oxide as the principal components, it is preferable that a relationship in which the ratio $x_2$ of W, Pd, Cu, and Zn that are respectively included in the W oxide, the Pd oxide, the Cu oxide, and the Zn oxide is greater for recording layers close to the light irradiation plane be satisfied.

According to the first or second embodiment of the present disclosure, in a case when at least one of the recording layers other than the recording layer at the deepest position from the light irradiation plane includes W oxide, Pd oxide, Cu oxide, and Zn oxide as the principal components, it is preferable that the atomic ratio a, the atomic ratio b, the atomic ratio c, and the atomic ratio d respectively satisfy the relationships $10 \leq a \leq 70$, $2 \leq b \leq 50$, $10 \leq c \leq 70$, and $5 \leq d \leq 60$.

According to the third embodiment of the present disclosure, in a case when an optical information recording medium target includes W, Pd, Cu, and Zn as the principal components, it is preferable that the atomic ratio a, the atomic ratio b, the atomic ratio c, and the atomic ratio d respectively satisfy the relationships $10 \leq a \leq 70$, $2 \leq b \leq 50$, $10 \leq c \leq 70$, and $5 \leq d \leq 60$.

According to the first embodiment of the present disclosure, it is preferable that a first protective layer and a second protective layer that are provided to be adjacent on both sides of the recording layers be further provided, and that the first protective layer and the second protective layer be dielectric layers or transparent conductive layers.

According to the embodiments of the present disclosure, by the ratio of W, Pd, and Cu that are respectively included in the W oxide, the Pd oxide, and the Cu oxide satisfying the relationship $0.17 \leq x_1$, it is possible to obtain favorable transmittance for recording layers other than the recording layer at the deepest position from the light irradiation plane.

As described above, according to the embodiments of the present disclosure, it is possible to realize an optical information recording medium recording layer with excellent transmittance properties and an optical information recording medium including the same.

Additional features and advantages are described herein, and will be apparent from the following Detailed Description and the figures.

DETAILED DESCRIPTION

The embodiments of the present disclosure will be described in detail below with reference to the drawings.
[Configuration of the Optical Information Recording Medium]

Figure 1A:
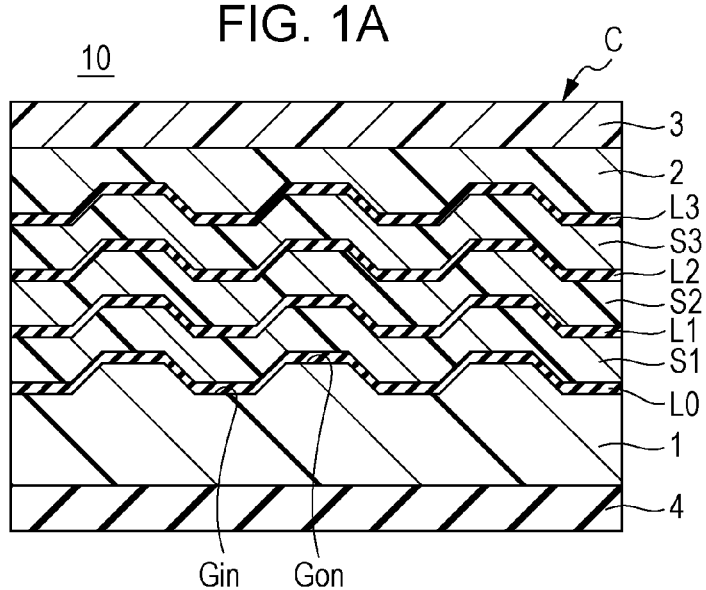
FIG. 1A is an outline cross-sectional diagram that illustrates a configuration example of an optical information recording medium according to an embodiment of the present disclosure and FIG. 1B is a schematic diagram that illustrates a configuration example of each information signal layer illustrated in FIG. 1A.

FIG. 1A is an outline cross-sectional diagram that illustrates a configuration example of an optical information recording medium according to an embodiment of the present disclosure. Such an optical information recording medium 10 is a so-called write-once type optical information recording medium, and as illustrated in FIG. 1A, has a configuration in which an information signal L0 layer, an intermediate layer S1, an information signal layer L1, an intermediate layer S2, an information signal layer L2, an intermediate layer S3, an information signal layer L3, and a light transmissive layer 2 that is a protective layer (cover layer) are laminated in such an order on the principal plane of a substrate 1. A hard coat layer 3 may be further provided on the surface of the light transmission layer 2 side as necessary. A barrier layer 4 may be further provided on the surface of the substrate 1 side as necessary. Here, in the description below, in a case when the information signal layers L0 to L3 are not particularly distinguished, reference is made to an information signal layer L.

With the optical information recording medium 10 of the embodiment, recording or reproduction of information signals is performed by irradiating laser light on each of the information signal layers L0 to L3 from a plane C of the light transmission layer 2 side. For example, recording or reproduction of information signals is performed by collecting laser light with a wavelength within a range of 400 nm to 410 nm by an objective lens with a numerical aperture in a range of 0.84 to 0.86 and irradiating each of the information signal layers L0 to L3 from the side of the light transmission layer 2. As such an optical information recording medium 10, for example, a BD-R is exemplified. Below, the plane C that is irradiated by laser light for recording information signals on the information signal layers L0 to L3 will be referred to as a light irradiation plane C.

The substrate 1, the information signal layers L0 to L3, the intermediate layers S1 to S3, the light transmission layer 2, the hard coat layer 3, and the barrier layer 4 that configure the optical information recording medium 10 will be sequentially described below.
(Substrate)

The substrate 1 has a ring shape, for example, with an opening (referred to as a center hole below) formed at the center. The principal plane of the substrate 1 is, for example, a concavo-convex surface, and the information signal L0 layer is formed on the concavo-convex surface. Below, the concave portions of the concavo-convex surface are referred to as an in-groove Gin, and the convex portions are referred to as an on-groove Gon.

As the shapes of the in-groove Gin and the on-groove Gon, various shapes such as, for example, a spiral shape or a concentric circular shape are exemplified. Further, one or both of the in-groove Gin and the on-groove Gon may be made to wobble (meander) in order to stabilize the linear velocity or the add the address information.

Although the diameter of the substrate 1 is not particularly limited as long as the diameter is rigid, for example, 120 mm is selected as the diameter. The thickness of the substrate 1 is selected with consideration of the rigidity, and 0.3 mm to 1.3 mm is preferably selected, and 0.6 mm to 1.3 mm, for example, 1.1 mm is more preferably selected. Further, for example, 15 mm is selected as the diameter of the center hole.

As the material of the substrate 1, for example a plastic material or glass may be used, and from the viewpoint of formability, a plastic material is preferably used. As a plastic material, for example, a polycarbonate resin, a polyolefin resin, an acryl resin, or the like may be used. Further, a polycarbonate resin is often used from the viewpoint of costs.
(Information Signal Layer)

Figure 1B:
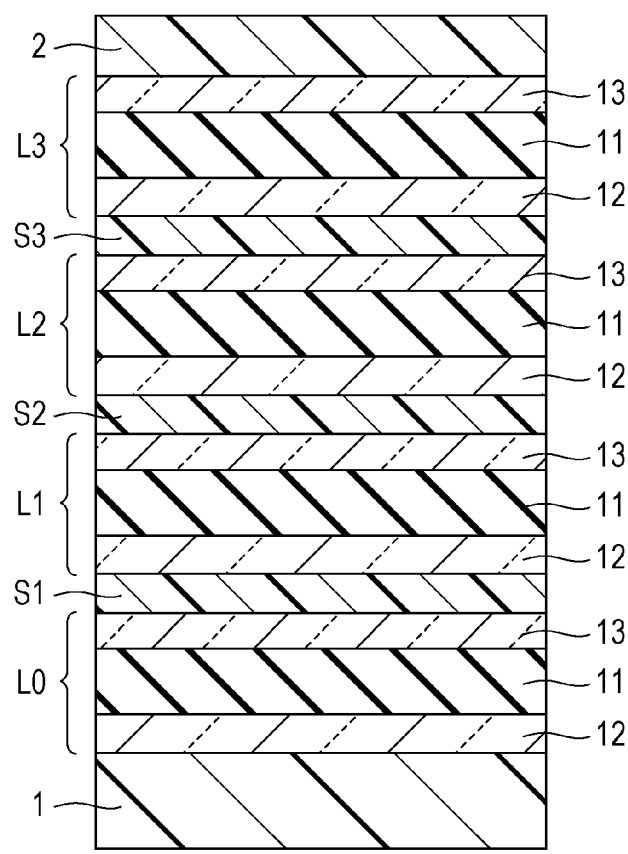

FIG. 1B is a schematic diagram that illustrates a configuration example of each information signal layer illustrated in FIG. 1A. As illustrated in FIG. 1B, the information signal layers L0 to L3 include, for example, an inorganic recording layer 11, a first protective layer 12 that is provided to be adjacent on the principal plane of the inorganic recording layer 11, and a second protective layer 13 that is provided to be adjacent to another principal plane of the inorganic recording layer 11. The durability of the inorganic recording layer 11 is able to be improved by such a configuration.

At least one of the inorganic recording layers 11 out of the information signal layers L1 to L3 other than the information signal L0 layer at the deepest position from the light irradiation plane C includes three elemental oxides of W oxide, Pd oxide, and Cu oxide as the principal components. The ratio of W, Pd, and Cu that are included in the three elemental oxides preferably satisfies the relationship $0.17 \le x_1$, more preferably satisfies the relationship $0.37 \le x_1$, still more preferably satisfies the relationship $0.37 \le x_1 \le 1.26$, and most preferably satisfies the relationship $0.56 \le x_1 \le 1.26$. In so doing, it is possible to realize excellent transmittance properties while maintaining the properties demanded of an information signal layer of the optical information recording medium. Here, as the properties demanded of an information signal layer of the optical information recording medium, favorable signal properties, a wide recording power margin, high reproduction durability, suppression of changes to the transmittance after recording, and the like are exemplified.

Here, $x_1$ is a variable defined as $x_1 = a/(b+0.8c)$.

a: atomic ratio (atomic %) of W with respect to the total of W, Pd, and Cu b: atomic ratio (atomic %) of Pd with respect to the total of W, Pd, and Cu c: atomic ratio (atomic %) of Cu with respect to the total of W, Pd, and Cu From the viewpoint of increasing the amount of light that reaches the information signal L0 layer at the deepest position from the light irradiation plane C, it is preferable that all of the inorganic recording layers 11 of the information signal layers L1 to L3 other than the information signal L0 layer have the above three elemental oxides as the principal components. In such a case, the ratio of W, Pd, and Cu that are included in the three elemental oxides preferably satisfies the relationship $0.17 \le x_1$, more preferably satisfies the relationship $0.37 \le x_1$, still more preferably satisfies the relationship $0.37 \le x_1 \le 1.26$, and most preferably satisfies the relationship $0.56 \le x_1 \le 1.26$. Further, since a higher recording sensitivity is generally demanded for information recording layers L that are closer to the layer at the deepest position and the transmittance tends to be lowered, information signal layers L that are close to the light irradiation plane C are often designed to have high transmittance. Accordingly, it is preferable that the value of the variable $x_1$ of the inorganic recording layers 11 of the information signal layers L1 to L3 be a greater value for information signal layers L that are close to the light irradiation plane C.

From the viewpoints of favorable signal properties, wide recording power margin, high reproduction durability, and suppression of changes in transmittance after recording, it is preferable that all of the inorganic recording layers 11 of the information signal layers L0 to L3 include the three elemental oxides as the principal components. In such a case, the ratio of W, Pd, and Cu that are included in the three elemental oxides preferably satisfies the relationship $0.17 \le x_1$, more preferably satisfies the relationship $0.37 \le x_1$, still more preferably satisfies the relationship $0.37 \le x_1 \le 1.26$, and most preferably satisfies the relationship $0.56 \le x_1 \le 1.26$. Further, it is preferable that the value of the variable $x_1$ of the inorganic recording layers 11 of the information signal layers L0 to L4 be a greater value for information signal layers L close to the light irradiation plane C. The reason is that the transmittance is able to be increased for information signal layers L close to the light irradiation plane C.

The atomic ratio a of W with respect to the total of W, Pd, and Cu is preferably within a range of 10 atomic % to 70 atomic %, and more preferably within a range of 14.2 atomic % to 31.8 atomic %. If the atomic ratio a is less than 10 atomic %, the transmittance tends to be low. On the other hand, if the atomic ratio a exceeds 70 atomic %, the recording sensitivity tends to decrease.

The atomic ratio b of Pd with respect to the total of W, Pd, and Cu is preferably within a range of 2 atomic % to 50 atomic %, and more preferably within a range of 4.4 atomic % to 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to W, Pd, and Cu is preferably within a range of 10 atomic % to 70 atomic %, and more preferably within a range of 28.5 atomic % to 68.1 atomic %. If the atomic ratio c is less than 10 atomic %, the reproduction durability tends to weaken. On the other hand, if the atomic ratio c exceeds 70 atomic %, the transmittance tends to decrease.

It is preferable that the inorganic recording layer 11 of at least one of the information signal layers L1 to L3 other than the information signal L0 layer that is at the deepest position of the light irradiation plane C include four elemental oxides in which a Zn oxide is added to the above three elemental oxides. The ratio of W, Pd, Cu, and Zn that are included in the four elemental oxides preferably satisfies the relationship $0.17 \le x_2$, more preferably satisfies the relationship $0.37 \le x_2$, still more preferably satisfies the relationship $0.37 \le x_2 \le 1.26$, and most preferably satisfies the relationship $0.56 \le x_2 \le 1.26$. By adding the Zn oxide, it is possible to lower the total amount other than the Zn oxide while satisfying the properties demanded of an information signal layer of an optical information recording medium and maintaining excellent transmission properties. That is, it is possible to lower the ratio of the expensive Pd oxide by adding the Zn oxide, realizing cost reduction.

Here, $x_2$ is a variable defined as $x_2 = (0.1d+a)/(b+0.8c)$.

a: atomic ratio (atomic %) of W with respect to the total of W, Pd, Cu, and Zn b: atomic ratio (atomic %) of Pd with respect to the total of W, Pd, Cu, and Zn c: atomic ratio (atomic %) of Cu with respect to the total of W, Pd, Cu, and Zn d: atomic ratio (atomic %) of Zn with respect to the total of W, Pd, Cu, and Zn From the viewpoint of increasing the amount of light that reaches the information signal L0 layer at the deepest position from the light irradiation plane C, it is preferable that all of the inorganic recording layers 11 of the information signal layers L1 to L3 other than the information signal L0 layer include the four elemental oxides as the principal components. In such a case, the ratio of W, Pd, and Cu that are included in the four elemental oxides preferably satisfies the relationship $0.17 \le x_2$, more preferably satisfies the relationship $0.37 \le x_2$, still more preferably satisfies the relationship $0.37 \le x_2 \le 1.26$, and most preferably satisfies the relationship $0.56 \le x_2 \le 1.26$. Further, it is preferable that the value of the variable $x_2$ of the inorganic recording layers 11 of the information signal layers L1 to L3 be a greater value for information signal layers L close to the light irradiation plane C. The reason is that the transmittance is able to be increased for information signal layers L close to the light irradiation plane C.

Further, from the viewpoints of favorable signal properties, wide recording power margin, high reproduction durability, suppression of changes in transmittance after recording, and low cost, it is preferable that all of the inorganic recording layers 11 of the information signal layers L0 to L3 include the four elemental oxides as the principal components. In such a case, the ratio of W, Pd, and Cu that are included in the three elemental oxides preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. Further, since a higher recording sensitivity is generally demanded for information recording layers L that are closer to the layer at the deepest position and the transmittance tends to be lowered, information signal layers L that are close to the light irradiation plane C are often designed to have high transmittance. Accordingly, it is preferable that the value of the variable $x_2$ of the inorganic recording layers 11 of the information signal layers L1 to L3 be a greater value for information signal layers L that are close to the light irradiation plane C.

The atomic ratio a of W with respect to the total of W, Pd, Cu, and Zn is preferably within a range of 10 atomic % to 70 atomic %, and more preferably within a range of 14.2 atomic % to 31.8 atomic %. If the atomic ratio a is less than 10 atomic %, the transmittance tends to be low. On the other hand, if the atomic ratio a exceeds 70 atomic %, the recording sensitivity tends to decrease.

The atomic ratio b of Pd with respect to the total of W, Pd, Cu, and Zn is preferably within a range of 2 atomic % to 50 atomic %, and more preferably within a range of 4.4 atomic % to 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to W, Pd, Cu, and Zn is preferably within a range of 10 atomic % to 70 atomic %, and more preferably within a range of 28.5 atomic % to 43.4 atomic %. If the atomic ratio c is less than 10 atomic %, the reproduction durability tends to weaken. On the other hand, if the atomic ratio c exceeds 70 atomic %, the transmittance tends to decrease.

The atomic ratio d of Zn with respect to W, Pd, Cu, and Zn is preferably within a range of 5 atomic % to 60 atomic %, and more preferably within a range of 17 atomic % to 41 atomic %. If the atomic ratio d is less than 5 atomic %, the cost reducing effect tends to weaken. On the other hand, if the atomic ratio d exceeds 60 atomic %, durability in a high-temperature and high-humidity environment tends to weaken.

As the material of the information signal layers L1 to L3 other than the three elemental oxides and the four elemental oxides described above, for example, it is possible to use a mixture of In oxide and Pd oxide. However, while excellent transmission properties of the information signal layers L of the optical information recording medium are thereby able to be obtained, since changes in properties before and after recording tend to increase due to the large amount of bubbles that are generated when recording marks are formed, and the suppression of changes in the transmittance after recording which is one of the properties that are demanded is not realized, it is preferable to use the three elemental oxides or the four elemental oxides described above.

As the material of the information signal L0 layer at the deepest position from the light irradiation plane C, it is also possible to use a mixture of an oxide and Pd oxide. However, from the viewpoint of the recording power margin properties, it is preferable to use the three elemental oxides or the four elemental oxides described above.

The thickness of an inorganic recording layer 11 is preferably within a range of 25 nm to 60 nm, and more preferably as 30 nm to 50 nm. If the thickness is less than 25 nm, the signal properties tend to deteriorate. On the other hand, if the thickness exceeds 60 nm, the recording power margin tends to become narrow.

It is preferable to use dielectric layers or transparent conductive layers as the first protective layer 12 and the second protective layer 13, and it is possible to use a dielectric layer for one of the first protective layer 12 and the second protective layer 13 and a transparent conductive layer for the other. By the dielectric layers or the transparent conductive layers functioning as oxygen barrier layers, it is possible to improve the durability of the inorganic recording layers 11. Further, by suppressing oxygen from escaping from the inorganic recording layers 11, it is possible to suppress changes (mainly detected as a decrease in the reflectance) in the film quality of the recording films, and it is possible to secure a film quality that is demanded of the inorganic recording layers 11. Furthermore, by providing dielectric layers or transparent conductive layers, it is possible to improve the recording properties. It is considered that the reason is that by thermal diffusion from laser light that is incident on the dielectric layers or the transparent conductive layers being optimally suppressed, bubbles on the recording portions being suppressed from becoming too large, and bubbles being suppressed from popping by the disintegration of the Pd oxide progressing too far, it is possible to optimize the forms of the bubbles during recording.

As the materials of the first protective layer 12 and the second protective layer 13, for example, an oxide, a nitride, a sulfide, a carbide, a fluoride, or a mixture thereof is exemplified. As the materials of the first protective layer 12 and the second protective layer 13, materials that are the same or different from each other are able to be used. As an oxide, for example, an oxide with one or more elements selected from a group composed of In, Zn, Sn, Al, Si, Ge, Ti, Ga, Ta, Nb, Hf, Zr, Cr, Bi, and Mg is exemplified. As a nitride, for example, a nitride with one or more elements selected from a group composed of In, Sn, Ge, Cr, Si, Al, Nb, Mo, Ti, Nb, Mo, Ti, W, Ta, and Zn, and more preferably a nitride with one or more elements selected from a group composed of Si, Ge, and Ti is exemplified. As a sulfide, for example, Zn sulfide is exemplified. As a carbide, for example, a carbide with one or more elements selected from a group composed of In, Sn, Ge, Cr, Si, Al, Ti, Zr, Ta, and W, and more preferably a carbide with one or more elements selected from a group composed of Si, Ti, and W is exemplified. As a fluoride, for example, a fluoride with one or more elements selected from a group composed of Si, Al, Mg, Ca, and La is exemplified. As a mixture thereof, for example, $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—$ZnO$ (IGZO), $Sn_2O_3$—$Ta_2O_5$ (TTO), $TiO_2$—$SiO_2$, and the like are exemplified.

The thickness of the first protective layer 12 is preferably within a range of 2 nm to 20 nm. If the thickness is less than 2 nm, the barrier effect tends to be lessened. On the other hand, if the thickness exceeds 20 nm, the recording power margin tends to narrow (deteriorate).

The thickness of the second protective layer 13 is preferably within a range of 2 nm to 50 nm. If the thickness is less than 2 nm, the barrier effect tends to be lessened. On the other hand, if the thickness exceeds 50 nm, the recording power margin tends to narrow (deteriorate).

For example, as the information signal layers L0 to L3, it is preferable to use a combination of the configurations below. For the L1 layer that is close to the layer at the deepest position where a high degree of sensitivity is demanded and the composition ratios of $x_1$ and $x_2$ become small, since there tends to be a large amount of Pd and Cu and therefore changes in the transmittance after recording tend to be large, it is preferable to suppress changes in the transmittance using a first protective layer 12 and a second protective layer 13 with an extinction coefficient k of equal to or greater than 0.05. Further, for the L3 layer where high transmittance is demanded and the composition ratios of $x_1$ and $x_2$ become large, since the power margin tends to narrow while changes in the transmittance after cording are small, it is preferable to secure the power margin using SIZ or IGZO for the first protective layer 12 and the second protective layer 13. Further, the L2 layer uses a combination of the layers of the L1 layer and the L3 layer, and in so doing, the properties of each layer in terms of the power margin or the suppression of changes in the transmittance are able to be equalized even if the materials of the recording layers or the degrees of sensitivity or transmittance that are demanded are different.

A mixture composed of the three components of the W oxide, the Pd oxide, and the Cu oxide will be referred to below as "WCPO" as appropriate. Further, a mixture composed of the four components of the W oxide, the Pd oxide, the Cu oxide, and the Zn oxide will be referred to as "WZCPO" as appropriate.

(Information Signal L0 layer)
    First protective layer 12: ITO
    Inorganic recording layer 11: WCPO ($0.4 \leq x_1 \leq 0.6$), preferably WZCPO ($0.4 \leq x_2 \leq 0.6$)
    Second protective layer 13: ITO (Information Signal Layer L1)
    First protective layer 12: material in which the extinction coefficient k is within a range of 0.05 to 0.6, preferably ITO
    Inorganic recording layer 11: WCPO ($0.5 \leq x_1 \leq 0.9$), preferably WZCPO ($0.5 \leq x_2 \leq 0.9$)
    Second protective layer 13: material in which the extinction coefficient k is within a range of 0.05 to 0.6, preferably ITO (Information Signal Layer L2)
    First protective layer 12: material in which the extinction coefficient k is within a range of 0.05 to 0.6, preferably ITO
    Inorganic recording layer 11: WCPO ($0.8 \leq x_1 \leq 1.2$), preferably WZCPO ($0.8 \leq x_2 \leq 1.2$)
    Second protective layer 13: SIZ or IGZO (Information Signal Layer L3)
    First protective layer 12: SIZ or IGZO
    Inorganic recording layer 11: WCPO ($0.8 \leq x_1 \leq 1.2$), preferably WZCPO ($0.8 \leq x_2 \leq 1.2$)
    Second protective layer 13: SIZ or IGZO (Intermediate Layers)

The intermediate layers S1 to S3 serve the roles of physically and optically separating L0, L1, L2, and L3 to keep sufficient distances, concavo-convex surfaces are provided on the surfaces thereof, and concentric circular or spiral-shaped grooves (in-grooves Gin and on-grooves Gon) are formed thereon. The thicknesses of the intermediate layers S1 to S3 are preferably set to 9 µm to 50 µm, and for example, S1 is 15 µm, S2 is 20 µm, and S3 is 10 µm. Although the materials of the intermediate layers S1 to S3 are not particularly limited, it is preferable to use an ultraviolet curable acryl resin, and since the intermediate layers S1 to S3 become the light paths of the laser light for the recording and reproduction of data to the back layers, it is preferable that the materials have sufficiently high light transmittance.

(Light Transmission Layer)

The light transmission layer 2 is a resin layer in which a light-sensitive resin such as, for example, an ultraviolet curable resin is cured. As such a resin layer, for example, an ultraviolet curable type acrylic resin is exemplified. Further, the light transmission layer 2 may be configured by a ring-shaped light transmission sheet and an adhesion layer for pasting the light transmission sheet on the substrate 1. It is preferable that the light transmission sheet be composed of a material with low absorbability with respect to the laser light that is used in recording and reproduction, and specifically, it is preferable that the light transmission sheet be composed of a material with a transmittance equal to or greater than 90%. As the material of the light transmission sheet, for example, a polycarbonate resin material, a polyolefin resin (for example, ZEONEX (registered trademark)), or the like may be used. As the material of the adhesion layer, for example, an ultraviolet curable resin, a pressure sensitive adhesive (PSA), or the like may be used.

The thickness of the light transmission layer 2 is preferably selected from a range of 10 µm to 177 µm, and for example, 53.5 µm is selected. By combining such a thin light transmission layer 2 with an objective lens with high NA (numerical aperture), for example, of approximately 0.85, high density recording is able to be realized.

(Hard Coat Layer)

The hard coat layer 3 is for conferring anti-scratching properties and the like on the light irradiation plane C. As the material of the hard coat layer 3, for example, an acrylic resin, a silicone resin, a fluorine resin, organic inorganic hybrid resin, or the like may be used.

(Barrier Layer)

The barrier layer 4 is for suppressing the outgassing (moisture release) from the back face of the substrate 1 during the film formation process. Further, the barrier layer 4 also functions as a moisture-proof layer that suppresses the absorption of moisture on the back face of the substrate 1. Although the material that configures the barrier layer 4 is not particularly limited as long as outgassing (moisture release) from the back face of the substrate 1 is able to be suppressed, to give an example, a dielectric with low gas transmission may be used. As such a dielectric, for example, SiN, $SiO_2$, TiN, AlN, ZnS—$SiO_2$, or the like may be used. The thickness of the barrier layer 4 is preferably set to of 5 nm to 40 nm. If the thickness is less than 5 nm, the barrier function of suppressing outgassing from the substrate back face tends to decrease. The reason is that on the other hand, if the thickness is greater than 40 nm, there is hardly any difference from a case when the barrier function of suppressing outgassing is lower, and further, productivity tends to decrease. It is preferable that the moisture transmittance of the barrier 4 be equal to or less than $5 \times 10^{-5}$ g/cm² per day.

With the optical information recording medium 10 of the configuration described above, when laser light is irradiated on the inorganic recording layers 11, the Pd oxide is heated and disintegrated by the laser light to release oxygen, and bubbles are generated on portions that are irradiated by the laser light. Irreversible recording of information signals is thereby able to be performed.

[Manufacturing Method of Optical Information Recording Medium]

Next, an example of a manufacturing method of an optical information recording medium according to an embodiment of the present disclosure will be described.

(Formation Process of Substrate)

First, the substrate 1 in which a concavo-convex surface is formed on the principal plane is formed. As the formation method of the substrate 1, for example, an injection formation method, a photopolymerization method (2P method), and the like may be used.

(Formation Process of Information Signal Layers)

Next, the information signal L0 layer is formed by sequentially laminating the first protective layer 12, the inorganic recording layer 11, and the second protective layer 13 on the substrate 1 by a sputtering method, for example.

The formation process of the first protective layer 12, the inorganic recording layer 11, and the second protective layer 13 will be described below in detail.

(Film Formation Process of First Protective Layer)

First, the substrate 1 is transported into a vacuum chamber in which a target that includes a dielectric material or a transparent conductive material as the principal component is provided, and the inside of the vacuum chamber is vacuumed until the vacuum chamber reaches a predetermined pressure. The first protective layer 12 is then formed on the substrate 1 by sputtering the target while introducing a process gas such as Ar gas or $O_2$ gas into the vacuum chamber. Although a radio frequency (RF) sputtering method or a direct current (DC) sputtering method, for example, may be used as the sputtering method, the direct current sputtering method is particularly preferable. The reason is that since the direct current sputtering method has a high film forming rate compared to the radio frequency sputtering method, it is possible to improve productivity.

(Film Formation Process of Inorganic Recording Layer)

Next, the substrate 1 is transported into a vacuum chamber in which a target for inorganic recording layer film formation is provided, and the inside of the vacuum chamber is vacuumed until the vacuum chamber reaches a predetermined pressure. The inorganic recording layer 11 is then formed on the first protective layer 12 by sputtering the target while introducing a process gas such as Ar gas or $O_2$ gas into the vacuum chamber.

Here, the target for inorganic recording layer film formation includes at least the three elemental oxides of the W oxide, the Pd oxide, and the Cu oxide as the principal components. The ratio of W, Pd, and Cu that are included in the three elemental oxides preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. Here, as described above, $x_1$ is a variable defined as $x_1 = a/(b+0.8c)$.

It is preferable that the target for inorganic recording layer film formation include four elemental oxides in which a Zn oxide is further added to the above three elemental oxides as the principal components. The ratio of W, Pd, Cu, and Zn that are included in the four elemental oxides preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. Here, as described above, $x_2$ is a variable defined as $x_2 = (0.1d+a)/(b+0.8c)$.

As the three elemental oxides or the four elemental oxides as the target for inorganic recording layer film formation, those within the same compositions as the inorganic recording layer 11 is preferable.

Further, the inorganic recording layer 11 may be formed by reactive sputtering with at least oxygen. In such a case, as the optical information recording medium target, it is preferable that a WCP metallic target in which W, Pd, and Cu are the principal components be used. The ratio of W, Pd, and Cu preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. Here, as described above, $x_1$ is a variable defined as $x = a/(b+0.8c)$.

Further, as the optical information recording medium target, it is preferable that a WZCP metallic target in which W, Pd, Cu, and Zn are the principal components be used. The ratio of W, Pd, Cu, and Zn preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. Here, as described above, $x_2$ is a variable defined as $x_2 = (0.1d+a)/(b+0.8c)$.

(Film Formation Process of Second Protective Layer)

Next, the substrate 1 is transported into a vacuum chamber in which a target that includes a dielectric material or a transparent conductive material as the principal component is provided, and the inside of the vacuum chamber is vacuumed until the vacuum chamber reaches a predetermined pressure. The second protective layer 13 is then formed on the inorganic recording layer 11 by sputtering the target while introducing a process gas such as Ar gas or $O_2$ gas into the vacuum chamber. Although a radio frequency (RF) sputtering method or a direct current (DC) sputtering method, for example, may be used as the sputtering method, the direct current sputtering method is particularly preferable. The reason is that since the direct current sputtering method has a high film forming rate compared to the radio frequency sputtering method, it is possible to improve productivity.

By the above, the information signal L0 layer is formed over the substrate 1.

(Formation Process of Intermediate Layer)

Next, an ultraviolet curable resin is evenly applied over the information signal L0 layer by a spin coating method, for example. After then irradiating ultraviolet radiation on the ultraviolet curable resin and curing the resin by pressing the concavo-convex pattern of a stamper on the ultraviolet curable resin that is evenly applied over the information signal L0 layer, the stamper is removed. In so doing, the concavo-convex pattern of the stamper is transferred onto the ultraviolet curable resin, and for example, the intermediate layer S1 on which the in-groove Gin and the on-groove Gon are provided is formed over the information signal L0 layer.

(Formation Process of Information Signal Layer and Intermediate Layers)

Next, similarly to the formation process of the information signal L0 layer and the intermediate layer S1 described above, the information signal layer L1, the intermediate layer S2, the information signal layer L2, the intermediate layer S3, and the information signal layer L3 are sequentially laminated over the intermediate layer S1 in such an order. At this time, by adjusting the film formation conditions or the target composition as appropriate, the film thicknesses or the compositions of the first protective layer 12, the inorganic recording layer 11, and the second protective layer 13 that configure the information signal layers L1 to L3 may be adjusted as appropriate. Further, by adjusting the conditions of the spin coating method as appropriate, the thicknesses of the intermediate layers S1 to S3 may be adjusted as appropriate.

(Formation Process of Light Transmission Layer)

Next, after spin coating a light-sensitive resin such as an ultraviolet curable resin (UV resin) over the information signal layer L3 by a spin coating method, for example, light such as ultraviolet rays is irradiated on the light-sensitive resin so that the resin is cured. In so doing, the light transmission layer 2 is formed over the information signal layer L3.

The desired optical information recording medium is obtained by the above processes.

EXAMPLES

Although the present disclosure will be described in detail below using test examples, the present disclosure is not limited to only such test examples.

Further, the information signal layers of the multi-layer optical information recording medium will be referred to as the L0 layer, the L1 layer, the L2 layer . . . in order from the substrate side toward the laser irradiation plane side.

The test examples will be described in the following order.
1. Composition of Inorganic Recording Layers
2. Transmittance Range of Two-Layer Optical Information Recording Medium
3. Transmittance Range of Four-Layer Optical Information Recording Medium 1. Composition of Inorganic Recording Layers Test Examples 1 to 15

First, a polycarbonate substrate with a thickness of 1.1 mm was formed by injection molding. Here, a concavo-convex surface with grooves was formed on the polycarbonate substrate. Next, the first protective layer, the inorganic recording layer, and the second protective layer were sequentially laminated over the polycarbonate substrate by a sputtering method. The specific configuration of each layer was as below.

First Protective Layer
material: $SiO_2-In_2O_3-ZrO_2$ (SIZ), thickness: 10 nm
Inorganic Recording Layer
material: WZCPO, thickness: 40 nm
Second Protective Layer
material: $SiO_2-In_2O_3-ZrO_2$ (SIZ), thickness: 25 nm The target composition was adjusted for each of Test Examples 1 to 15 so that the respective atomic ratios c, d, b, and a of Cu, Zn, Pd, and W within the WZCPO of the inorganic recording layer were the values illustrated in Table 1.

sured using a spectrophotometer (manufactured by JASCO Corporation, product name: V530). The results are shown in Table 1.

Figure 2A:
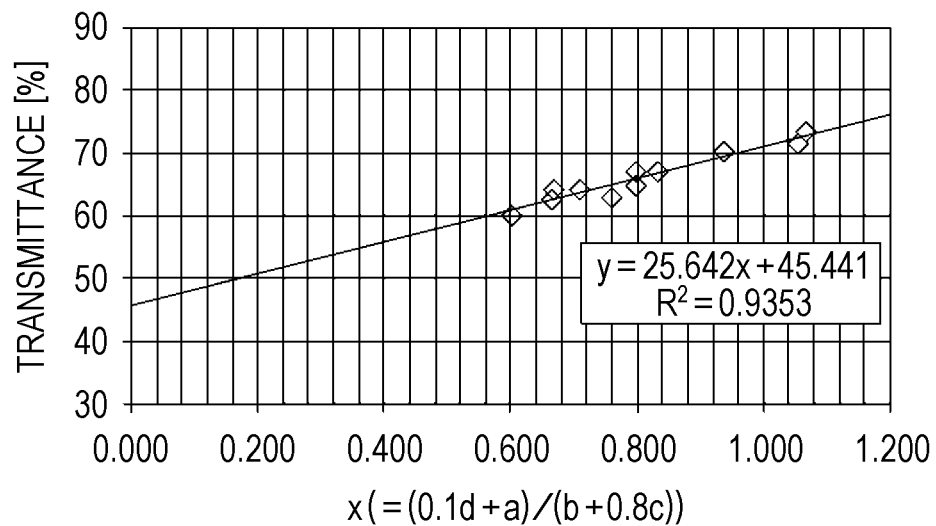
FIG. 2A is a graph that illustrates the relationship between a variable x and the transmittance of the optical information recording media of Test Examples 1 to 13 and FIG. 2B is a graph that illustrates the relationship between the transmittance and the maximum recording power Pwo including the optical information recording media of Test Examples 1 to 13.

Next, linear approximation was performed using the measured transmittance and the atomic ratios c, d, b, and a. The results are illustrated in FIG. 2A. In FIG. 2A, the horizontal axis indicates the variable $x(=0.1d+a)/(b+0.8c))$, and the vertical axis indicates the transmittance. As illustrated in FIG. 2A, the linear approximation is represented by $y=25.642x+45.441$. Here, y indicates the transmittance [%] and x indicates $(0.1d+a)/(b+0.8c)$. As a way of performing the linear approximation, each coefficient was determined by multiplying a coefficient on each ratio so that the power of a determination coefficient R2 was the greatest with the sum of each ratio of the W oxide and the Zn oxide with relatively small extinction coefficients as the numerator and the sum of each ratio of the Pd oxide and the Cu oxide with relatively large extinction coefficients as the denominator.

(Optimum Recording Power Evaluation)

Figure 2B:
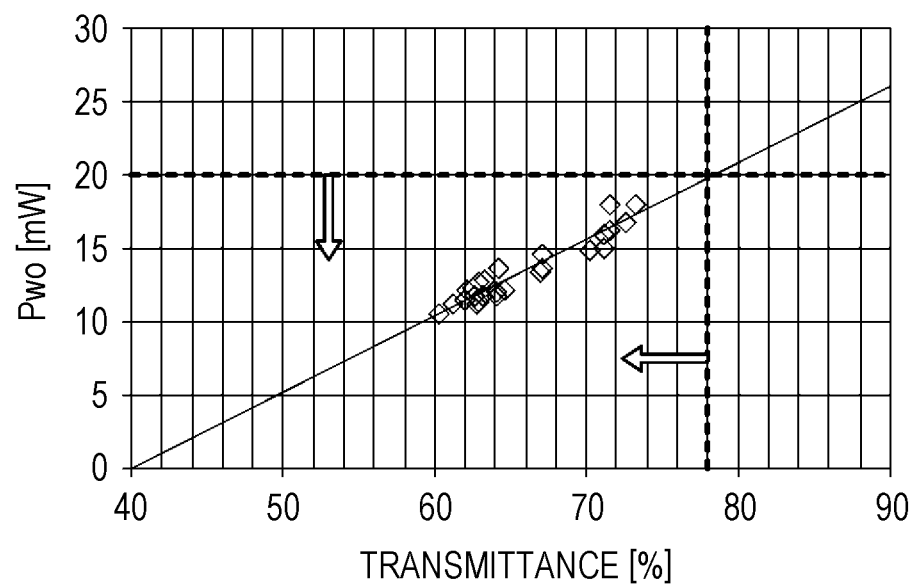

Using a disc tester (manufactured by Pulstec Industrial Co., Ltd., product name: ODU-1000), 1-7 modulation data with a density of 32 GB per layer was recorded and reproduced with a recording wavelength of 405 nm and a recording linear velocity of 7.69 m/s to ascertain the recording power at which the i-MLSE value is the smallest, and such a recording power was taken as the optimum recording power Pwo. The results are illustrated in FIG. 2B. Here, the i-MLSE value is a signal evaluation index equivalent to a jitter of the related art for high density recording and reproduction, and the smaller the value, the more favorable the signal properties.

Figure 3:
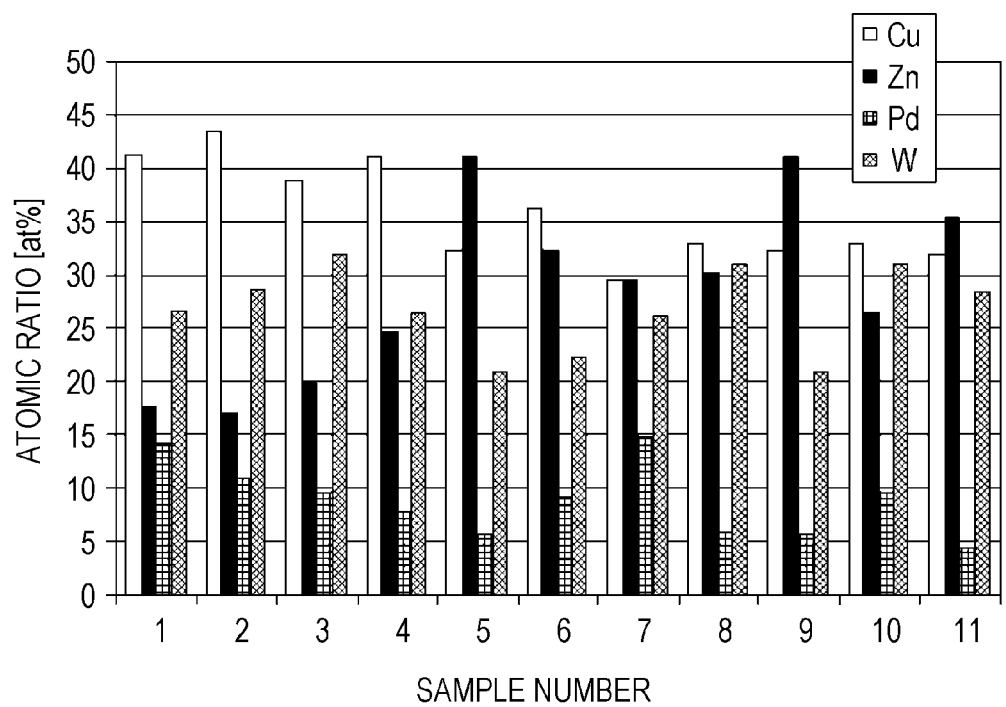
FIG. 3 is a graph that illustrates the composition ratios of the inorganic recording layers of the optical information recording media of Test Examples 1 to 13.

Table 1 illustrates the composition ratios, the variables x, and the transmittances of the inorganic recording layers of Test Examples 1 to 15. FIG. 3 is a graph that illustrates the composition ratios of the inorganic recording layers of Test Examples 1 to 13.

TABLE 1

| | Atomic Ratio c (Atomic %) of Cu | Atomic Ratio d (Atomic %) of Zn | Atomic Ratio b (Atomic %) of Pd | Atomic Ratio a (Atomic %) of W | x(x1, x2) = (0.1d + a)/(b + 0.8c) | Transmittance (%) |
|---|---|---|---|---|---|---|
| Test Example 1 | 41.3 | 17.7 | 14.3 | 26.7 | 0.601 | 60 |
| Test Example 2 | 43.4 | 17 | 10.9 | 28.7 | 0.666 | 62.6 |
| Test Example 3 | 38.8 | 19.8 | 9.6 | 31.8 | 0.831 | 66.9 |
| Test Example 4 | 41.4 | 24.7 | 7.8 | 26.4 | 0.710 | 64.1 |
| Test Example 5 | 32.4 | 41 | 5.6 | 21 | 0.796 | 67.1 |
| Test Example 6 | 36.3 | 32.4 | 9.1 | 22.2 | 0.667 | 64.1 |
| Test Example 7 | 29.5 | 29.5 | 14.8 | 26.2 | 0.759 | 63 |
| Test Example 8 | 33 | 30.1 | 5.9 | 31 | 1.053 | 71.6 |
| Test Example 9 | 32.4 | 41 | 5.6 | 21 | 0.796 | 64.87 |
| Test Example 10 | 33 | 26.5 | 9.5 | 31 | 0.937 | 70.1 |
| Test Example 11 | 31.9 | 35.3 | 4.4 | 28.4 | 1.067 | 73.3 |
| Test Example 12 | 28.5 | 25 | 32.2 | 14.2 | 0.304 | 73.3 |
| Test Example 13 | 68.1 | 0 | 25.5 | 16.4 | 0.205 | 73.3 |
| Test Example 14 | 58.11 | 0 | 25.5 | 16.39 | 0.228 | 51.28 |
| Test Example 15 | 28.48 | 25.09 | 32.2 | 14.24 | 0.305 | 53.25 |

Next, by evenly applying an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was obtained.

By the above, the desired optical information recording medium was obtained.

(Transmittance Evaluation)

The transmittances of the optical information recording media of Test Examples 1 to 15 obtained as described above with respect to a recording wavelength of 405 nm were mea- The following is deduced from the linear approximation illustrated in FIG. 2A.

For the transmittance to be equal to or greater than 50%, it is preferable that the variable x be equal to or greater than 0.17.

For the transmittance to be equal to or greater than 55%, it is preferable that the variable x be equal to or greater than 0.37.

For the transmittance to be equal to or greater than 60%, it is preferable that the variable x be equal to or greater than 0.56.

For the transmittance to be equal to or less than 78%, it is preferable that the variable x be equal to or less than 1.26.

Here, with a multi-layer optical information recording medium, it is preferable that the transmittances of information signal layers equal to or higher than the L1 layer (L1 layer, L2 layer, L3 layer, . . . ) be equal to or greater than 55%. The reason why a transmittance equal to or greater than 55% is preferable will be described later. Here, with a two-layer disc using a recording film composition other than WZCPO (ZnS—SiO$_2$—Sb—Sn, TePdO, and the like), in order to increase the reflectance of the L0 layer, it is preferable that the transmittance of the L1 layer be equal to or greater than 50%.

The following is deduced from the linear approximation illustrated in FIG. 2B.

It is seen that for the optimum recording power Pwo to be equal to or less than 20 mW, it is preferable that the transmittance be equal to or less than 78%. Here, the optimum recording power Pwo: 20 mW is the upper limit value of the optimum recording power Pwo of a consumer drive device. If the upper limit value is exceeded, the formation of mark bubbles during recording becomes insufficient since the demanded laser amount is not supplied, and as a result, the signal properties deteriorate.

2. Transmittance Range of Two-Layer Optical Information Recording Medium

Test Examples 16 to 27

First, a polycarbonate substrate with a thickness of 1.1 mm was formed by injection molding. Here, a concavo-convex surface with grooves was formed on the polycarbonate substrate.

Next, the first protective layer, the inorganic recording layer, and the second protective layer were sequentially laminated over the polycarbonate substrate by a sputtering method to create the L0 layer. Here, the L0 layer is the L0 layer for a two-layer optical information recording medium.

The specific configuration of each layer was as below.
First Protective Layer
material: ITO, thickness: 10 nm
Inorganic Recording Layer
material: WZCPO, thickness: 26 nm to 30 nm
composition ratio: a=10, b=30, c=30, d=30
Second Protective Layer
material: TaN, thickness: 6 nm to 16 nm
The film formation conditions for each of Test Examples 16 to 27 were adjusted so that the thicknesses of the inorganic recording layers and the second protective layers were the values shown in Table 2.

Next, by evenly applying an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was obtained.

By the above, an optical information recording medium that includes only the L0 layer was obtained.

(i-MLSE Evaluation)

The i-MLSE of the optical information recording media of Test Examples 16 to 27 obtained as described above was ascertained as below. Using a disc tester (manufactured by Pulstec Industrial Co., Ltd., product name: ODU-1000), the i-MLSE value was measured by recording and reproducing 1-7 modulation data with a density of 32 GB per layer with NA=0.85, a recording wavelength of 405 nm, and a recording linear velocity of 7.69 m/s.

(Reflectance Evaluation)

The reflectances of the optical information recording media of Test Examples 16 to 27 obtained as described above were measured as below. Here, the reflectance of a single-layer optical information recording medium manufactured using only the L0 layer of a two-layer optical information recording media is referred to as the reflectance of the L0 layer alone. The reflectances were measured using a disc tester (manufactured by Pulstec Industrial Co., Ltd., product name: ODU-1000), with NA=0.85 and a recording wavelength of 405 nm.

Table 2 illustrates the measurement result of the i-MLSE and the transmittances of the optical information recording media of Test Examples 16 to 27.

TABLE 2

| | Material of First Protective Layer | Thickness of First Protective Layer (nm) | Material of Recording Layer | Thickness of Recording Film (nm) | Material of Second Protective Layer | Thickness of Second Protective Layer (nm) | Reflectance (%) | i-MLSE (%) |
|---|---|---|---|---|---|---|---|---|
| Test Example 16 | ITO | 10 | WZCPO | 30 | TaN | 12 | 12.5 | 10.6 |
| Test Example 17 | | 10 | | 28 | | 12 | 13.4 | 10.6 |
| Test Example 18 | | 10 | | 26 | | 12 | 14.3 | 11.1 |
| Test Example 19 | | 10 | | 30 | | 10 | 12.6 | 10.3 |
| Test Example 20 | | 10 | | 28 | | 10 | 12.9 | 10.4 |
| Test Example 21 | | 10 | | 26 | | 10 | 14.1 | 11.0 |
| Test Example 22 | | 10 | | 30 | | 8 | 12.3 | 10.3 |
| Test Example 23 | | 10 | | 28 | | 8 | 12.8 | 10.2 |
| Test Example 24 | | 10 | | 26 | | 8 | 13.1 | 10.8 |
| Test Example 25 | | 10 | | 26 | | 6 | 11.5 | 9.8 |
| Test Example 26 | | 10 | | 26 | | 14 | 15.2 | 11.6 |
| Test Example 27 | | 10 | | 26 | | 16 | 16.2 | 12.2 |

WZCPO: mixture of W oxide, Pd oxide, Cu oxide, and Zn oxide

Figure 4A:
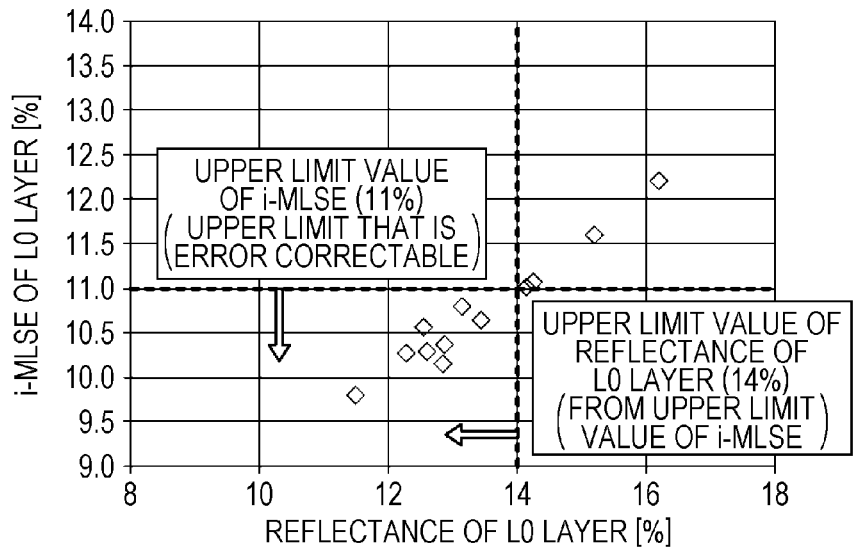
FIG. 4A is a graph that illustrates the relationship between the i-MLSE of the L0 layer and the reflectance of the L0 layer in optical information recording media of Test Examples 16 to 27.

FIG. 4A is a graph that illustrates the relationship between the i-MLSE and the reflectances ascertained as described above. It is seen from FIG. 4A that for the i-MLSE value of the L0 layer to be equal to or less than 11%, it is important for the reflectance of the L0 layer to be equal to or less than 14%. Here, the i-MLSE value 11% is the upper limit value that is said to be error correctable by a consumer drive device. Although the reflectance was able to be improved by causing any or a combination of the first protective layer, the inorganic recording layer, and the second protective layer to be thinner than the above film thicknesses, if any of the above are made thinner, the i-MLSE values would deteriorate. It is presumed that the i-MLSE values deteriorate since the formation of bubbles during recording becomes inappropriate as a result of changes in the heat accumulation or heat release of the inorganic recording layer.

Test Examples 28 to 39

With a reflectance of the L0 layer alone ascertained as described above of 14% as the premise, the reflectance of the L0 layer with respect to the transmittance of the L1 layer of a two-layer optical information recording medium was ascertained by optical simulation. The results thereof are illustrated in Table 3 and FIG. 4B. Here, if the reflectance of the L0 layer is R and the transmittance of L1 is T, R is calculated by Formula (I) below.

$$R = 14\% \text{ (reflectance of } L0 \text{ layer alone)} \times T^2 \quad (1)$$

Table 3 illustrates the reflectances of the L0 layers alone, the transmittances of the L1 layers, and the reflectances of the L0 layers of the optical information recording media of Test Examples 28 to 39.

TABLE 3

|  | Reflectance of L0 Layer alone R_L0 (%) | Transmittance of L1 Layer T (%) | Reflectance of L0 layer R (%) |
| --- | --- | --- | --- |
| Test Example 28 | 14 | 30 | 1.3 |
| Test Example 29 | 14 | 35 | 1.7 |
| Test Example 30 | 14 | 40 | 2.2 |
| Test Example 31 | 14 | 45 | 2.8 |
| Test Example 32 | 14 | 50 | 3.5 |
| Test Example 33 | 14 | 55 | 4.2 |
| Test Example 34 | 14 | 60 | 5.0 |
| Test Example 35 | 14 | 65 | 5.9 |
| Test Example 36 | 14 | 70 | 6.9 |
| Test Example 37 | 14 | 75 | 7.9 |
| Test Example 38 | 14 | 80 | 9.0 |
| Test Example 39 | 14 | 85 | 10.1 |

Figure 4B:
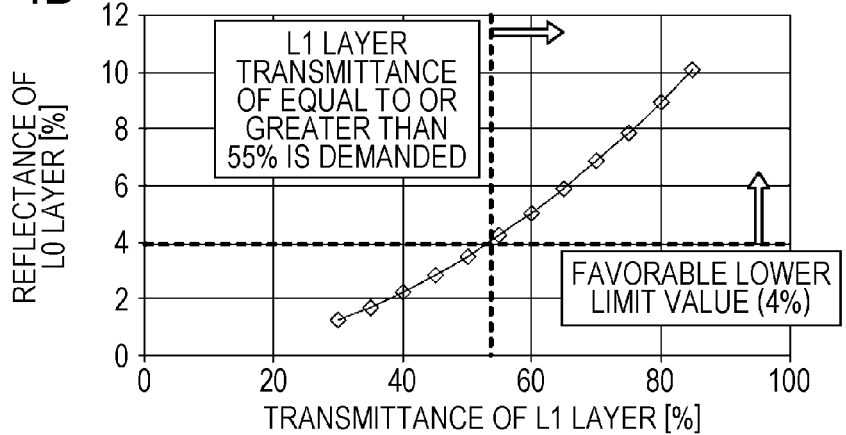
FIG. 4B is a graph that illustrates the relationship between the transmittance of the L1 layer and the reflectance of the L0 layer in the optical information recording media of Test Examples 28 to 39.

It is seen from FIG. 4B that for the reflectance of the L1 layer of a two-layer optical information recording medium to be equal to or greater than 4%, it is important for the transmittance of the L1 layer to be equal to or greater than 55%. Here, the reflectance 4% of the L1 layer is the lower limit value that is demanded for an information signal to be reproduced using a consumer two-layer compatible drive device.

3. Transmittance Range of Four-Layer Optical Information Recording Medium

Test Examples 40 to 48

The i-MLSE of the L0 layer when the transmittance of the L1 layer alone of a four-layer optical information recording medium is changed was measured. The results are illustrated in Table 4 and FIG. 4C. Here, since the recording properties of L1 are not the subject of interest, adjustment of the transmittance of the L1 layer was performed by the adjustment of the thickness of the inorganic recording layer according to the conditions below.
Specific film configurations of the L1 layer were as below.
  First Protective Layer
  material: ITO, thickness: 7 nm
  Inorganic Recording Layer
  material: WZCPO, thickness: 2 nm to 130 nm
  composition ratio: a=25, b=10, c=40, d=25
  Second Protective Layer
  material: ITO, thickness: 10 nm
Specific film configurations of the L0 layer were as below.
  First Protective Layer
  material: ITO, thickness: 8 nm
  Inorganic Recording Layer
  material: WZCPO, thickness: 30 nm
  composition ratio: a=10, b=30, c=30, d=30
  Second Protective Layer
  material: TaN, thickness: 10 nm Table 4 illustrates the reflectances of the L0 layers alone, the transmittances of the L1 layer, and the i-MLSE values of the L0 layers of the optical information recording media of Test Examples 40 to 48.

TABLE 4

|  | Thickness of Inorganic Recording Layers of L1 Layer (nm) | Transmittance of L1 Layer (%) | i-MLSE of L0 Layer (%) |
| --- | --- | --- | --- |
| Test Example 40 | 130 | 35 | 14.6 |
| Test Example 41 | 100 | 40 | 13 |
| Test Example 42 | 80 | 45 | 12 |
| Test Example 43 | 60 | 50 | 11.2 |
| Test Example 44 | 50 | 55 | 10.8 |
| Test Example 45 | 40 | 60 | 10.5 |
| Test Example 46 | 30 | 65 | 10.2 |
| Test Example 47 | 15 | 70 | 10 |
| Test Example 48 | 2 | 75 | 10 |

Figure 4C:
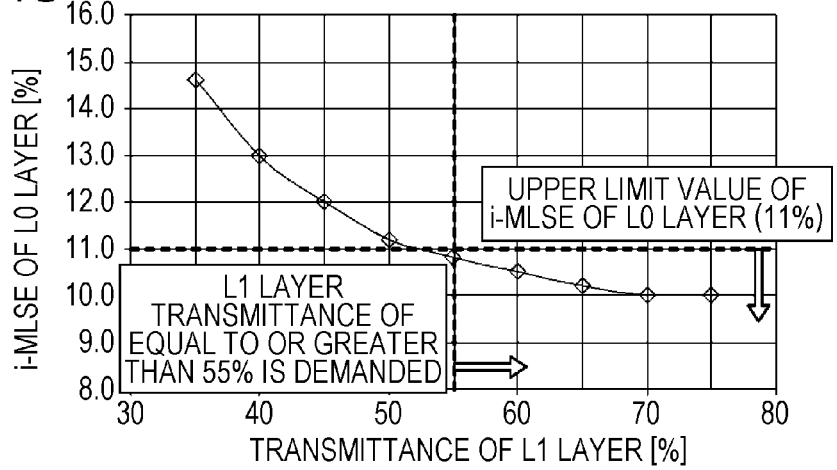
FIG. 4C is a graph that illustrates the relationship between the transmittance of the L1 layer and the i-MLSE of the L0 layer of the optical information recording media of Test Examples 40 to 48.

It is seen from FIG. 4C that for the i-MLSE value of the L0 layer to be equal to or less than 11%, it is important for the transmittance of the L1 layer to be equal to or greater than 55%. Here, the i-MLSE value 11% is the upper limit value that is error correctable by a consumer drive device. The reason is that in a case when the transmittance of the L1 layer is low, since the signal amount of the L0 layer decreases, it is thought that sufficient S/N for reproduction is not obtained. Therefore, the higher the transmittance of L1, the better the signal properties of the L0 layer.

By the above, it is seen that with a multi-layer optical information recording medium with two layers or four layers, it is preferable that the transmittances of information signal layers equal to or above the L1 layer (L1 layer, L2 layer, L3 layer, ...) be equal to or greater than 55%.

Although the embodiments of the present disclosure have been described in detail above, the present disclosure is not limited to the embodiments described above, and various modifications based on the technical ideas of the embodiments of the present disclosure are possible.

For example, the configurations, methods, processes, shapes, materials, numerical values, and the like exemplified in the embodiments described above are only examples, and different configurations, methods, processes, shapes, materials, numerical values, and the like may be used as necessary.

Further, the configurations, methods, processes, shapes, materials, numerical values, and the like of the embodiments described above may be combined with one another within a range that does not depart from the gist of the present disclosure.

Furthermore, although a case when the information recording medium includes a four-layer information signal layer has been described as an example in the embodiments described above, the number of layers of the information signal layer is not limited thereto, and it is possible for the information signal layer to have an arbitrary number of layers of two layers or more.

In addition, although a case when the present disclosure is applied to an optical information recording medium with a configuration in which two or more information signal layers and a light transmission layer are laminated in such an order on a substrate and in which recording or reproduction of information signals is performed by irradiating laser light on the information signal layers from the light transmission layer side has been described as an example in the embodiments described above, the present disclosure is not limited to such an example. For example, the present disclosure is able to be applied to an optical information recording medium with a configuration in which two or more information signal layers and a protective layer are laminated in such an order on a substrate and in which recording or reproduction of information signals is performed by irradiating laser light on the two or more information signal layers from the substrate side or to an optical information recording medium with a configuration in which two or more information signal layers are provided between two substrates while recording or reproduction of information signals is performed by irradiating laser light on the information signal layers from the side of one of the substrates.

Further, although a case when each layer of the optical information recording medium is formed by a sputtering method has been described as an example in the embodiments described above, the film formation method is not limited thereto, and other film formation methods may be used. As other film formation methods, for example, CVD methods (Chemical Vapor Deposition: technique in which a thin film is separated from vapor using a chemical reaction) such as heat CVD, plasma CVD, or light CVD, PVD methods (Physical Vapor Deposition: technique in which a thin film is formed by agglomerating a material that is physically vaporized in a vacuum on a substrate) such as vacuum deposition, plasma-assisted deposition, or ion plating may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical information recording medium comprising:
a substrate;
two or more recording layers provided on the substrate; and
a protective layer provided on the recording layers,
wherein a surface of one of a side of the substrate and the protective layer is a light irradiation plane on which light for recording information signals on the two or more recording layers is irradiated,
at least one of recording layers other than a recording layer at a deepest position from the light irradiation plane includes W oxide, Pd oxide, and Cu oxide as principal components, and
a ratio of W, Pd, and Cu that are respectively included in the W oxide, the Pd oxide, and the Cu oxide satisfies the relationship $0.17 \leq x_1$ (where $x_1 = a/(b+0.8c)$, where a: atomic ratio (atomic %) of W with respect to a total of W, Pd, and Cu, b: atomic ratio (atomic %) of Pd with respect to a total of W, Pd, and Cu, and c: atomic ratio (atomic %) of Cu with respect to a total of W, Pd, and Cu).

2. The optical information recording medium according to claim 1,
wherein at least one of the recording layers other than the recording layer at the deepest position from the light irradiation plane includes W oxide, Pd oxide, Cu oxide, and Zn oxide as principal components, and
the ratio of W, Pd, Cu, and Zn that are respectively included in the W oxide, the Pd oxide, the Cu oxide, and the Zn oxide satisfies a relationship $0.17 \leq x_2$ (where $x_2 = (0.1d+a)/(b+0.8c)$, where a: atomic ratio (atomic %) of W with respect to a total of W, Pd, Cu, and Zn, b: atomic ratio (atomic %) of Pd with respect to a total of W, Pd, Cu, and Zn, c: atomic ratio (atomic %) of Cu with respect to a total of W, Pd, Cu, and Zn, and d: atomic ratio (atomic %) of Zn with respect to a total of W, Pd, Cu, and Zn).

3. The optical information recording medium according to claim 1,
wherein the ratio of W, Pd, and Cu that are respectively included in the W oxide, the Pd oxide, and the Cu oxide satisfies a relationship $0.37 \leq x_1$.

4. The optical information recording medium according to claim 1,
wherein the ratio of W, Pd, and Cu that are respectively included in the W oxide, the Pd oxide, and the Cu oxide satisfies a relationship $0.37 \leq x_1 \leq 1.26$.

5. The optical information recording medium according to claim 1,
wherein all recording layers other than the recording layer at the deepest position from the light irradiation plane includes W oxide, Pd oxide, and Cu oxide as the principal components, and
the ratio of W, Pd, and Cu that are respectively included in the W oxide, the Pd oxide, and the Cu oxide satisfies a relationship $0.17 \leq x_1$.

6. The optical information recording medium according to claim 5,
wherein a value of $x_1$ becomes greater for recording layers closer to the light irradiation plane.

7. The optical information recording medium according to claim 1,
wherein a relationship in which the ratio $x_1$ of W, Pd, and Cu that are respectively included in the W oxide, the Pd oxide, and the Cu oxide is greater for recording layers close to the light irradiation plane is satisfied.

8. The optical information recording medium according to claim 1,
wherein the atomic ratio a, the atomic ratio b, and the atomic ratio c respectively satisfy relationships $10 \leq a \leq 70$, $2 \leq b \leq 50$, and $10 \leq c \leq 70$.

9. The optical information recording medium according to claim 2,
wherein the ratio of W, Pd, Cu, and Zn that are respectively included in the W oxide, the Pd oxide, the Cu oxide, and the Zn oxide satisfies a relationship $0.37 \leq x_2$.

10. The optical information recording medium according to claim 2,
wherein the ratio of W, Pd, Cu, and Zn that are respectively included in the W oxide, the Pd oxide, the Cu oxide, and the Zn oxide satisfies a relationship $0.37 \leq x_2 \leq 1.26$.

11. The optical information recording medium according to claim 2,
wherein all recording layers other than the recording layer at the deepest position from the light irradiation plane includes W oxide, Pd oxide, Cu oxide, and Zn oxide as the principal components, and
the ratio of W, Pd, Cu, and Zn that are respectively included in the W oxide, the Pd oxide, the Cu oxide, and the Zn oxide satisfies a relationship $0.17 \leq x_2$.

12. The optical information recording medium according to claim 11,
wherein a value of $x_2$ becomes greater for recording layers closer to the light irradiation plane.

13. The optical information recording medium according to claim 2,
wherein a relationship in which the ratio $x_2$ of W, Pd, Cu, and Zn that are respectively included in the W oxide, the Pd oxide, the Cu oxide, and the Zn oxide is greater for recording layers close to the light irradiation plane is satisfied.

14. The optical information recording medium according to claim 2,
  wherein the atomic ratio a, the atomic ratio b, the atomic ratio c, and the atomic ratio d respectively satisfy relationships $10 \leq a \leq 70$, $2 \leq b \leq 50$, $10 \leq c \leq 70$, and $5 \leq d \leq 60$.

15. The optical information recording medium according to claim 1, further comprising:
  a first protective layer and a second protective layer that are provided to be adjacent on both sides of the recording layers,
  wherein the first protective layer and the second protective layer are dielectric layers or transparent conductive layers.

16. An optical information recording medium recording layer comprising:
  W oxide, Pd oxide, and Cu oxide as principal components,
  wherein a ratio of W, Pd, and Cu that are respectively included in the W oxide, the Pd oxide, and the Cu oxide satisfies a relationship $0.17 \leq x_1$ (where $x_1 = a/(b+0.8c)$, where a: atomic ratio (atomic %) of W with respect to a total of W, Pd, and Cu, b: atomic ratio (atomic %) of Pd with respect to a total of W, Pd, and Cu, and c: atomic ratio (atomic %) of Cu with respect to a total of W, Pd, and Cu).

17. A manufacturing method of an optical information recording medium comprising:
  forming a metal oxide recording layer by reactive sputtering with at least oxygen using an optical information recording medium target,
  wherein the optical information recording medium target includes W, Pd, and Cu as principal components,
  and a ratio of W, Pd, and Cu satisfies a relationship $0.17 \leq x_1$ (where $x_1 = a/(b+0.8c)$, where a: atomic ratio (atomic %) of W with respect to a total of W, Pd, and Cu, b: atomic ratio (atomic %) of Pd with respect to a total of W, Pd, and Cu, and c: atomic ratio (atomic %) of Cu with respect to a total of W, Pd, and Cu).

* * * * *